United States Patent Office 3,290,244
Patented Dec. 6, 1966

3,290,244
GREASE COMPOSITIONS CONTAINING ATACTIC POLYPROPYLENE
Arthur T. Polishuk and Herbert L. Johnson, Media, Pa., assignors to Sun Oil Company, Philadelphia, Pa., a corporation of New Jersey
No Drawing. Filed July 11, 1963, Ser. No. 294,267
13 Claims. (Cl. 252—32)

This invention relates to grease compositions having improved adhesive and cohesive properties due to the incorporation therein of an oil-soluble atactic homopolymer of propylene (herein referred to as oil-soluble atactic polypropylene) having a molecular weight in the range of 10,000 to 50,000 or an oil-soluble atactic copolymer of ethylene and propylene having an intrinsic viscosity in the range of 0.3 to 4.0.

Many attempts have been made in the past to improve the adhesion and cohesion of greases. Thus in U.S. Patent No. 2,917,458, Morway et al. disclose that the adhesion and cohesion of complex soap greases can be improved by incorporating into the grease a mixture of isotactic (crystalline) polypropylene of 100,000–1,000,000 molecular weight and atactic (amorphous) polypropylene of 300–10,000 molecular weight in which mixture the ratio of atactic polypropylene to isotactic polypropylene is at least 10:1. As stated in this patent the use of only atactic polypropylene without any isotactic polypropylene does not result in a grease having good adhesive and cohesive properties.

We have now discovered, however, that if oil-soluble atactic polypropylene having a molecular weight in the range of 10,000 to 50,000, preferably 15,000 to 35,000, is incorporated into a grease, the adhesive and cohesive properties of the grease are substantially improved. Surprisingly, these improved properties can be obtained without including in the grease any isotactic polypropylene. Furthermore, the improvement in adhesion and cohesion obtained is unexpectedly higher when atactic polypropylene is used than when other polyolefins such as polyethylene or polyisobutylene are used. We have now also discovered that the adhesive-cohesive properties of a grease can be even more substantially improved by incorporating into the grease an oil-soluble atactic ethylene-propylene copolymer having an intrinsic viscosity in the range of 0.3 to 4.0, preferably 0.5 to 2.5. All viscosities referred to herein are in Tetralin at 135° C. Surprisingly the improvement obtained by the use of the ethylene-propylene copolymer is unexpectedly superior to that obtained when either atactic polypropylene is used or when other polyolefins such as those already mentioned are used.

The grease compositions of the invention comprise a mineral lubricating oil, a thickening agent, and an atactic polymer of the type described, these individual components being more fully described both as to type and amount as follows:

The greases of the invention contain a major proportion of a mineral lubricating oil. All proportions and percentages in this specification are by weight of the total grease composition. The oil can be paraffinic, naphthenic, or aromatic and can have been prepared by conventional petroleum refining techniques such as solvent extraction, sulfuric acid treatment, clay treatment, etc. Normally the lubricating oil used in the grease composition will have a viscosity in the range of 35–180 S.U.S. at 210° F.

The grease compositions of the invention also contain a thickener. The amount of thickener used is a minor proportion but should be sufficient to thicken the lubricating oil used to grease consistency. Normally the amount of thickener used will be 5–40%. Any conventional thickener can be employed such as the fatty acid metallic soaps, inorganic thickeners such as colloidal silica and bentonite clay, etc. Since greases containing a fatty acid metallic soap as thickener have superior properties for many applications, they are preferred. The metal component of the soap can be any of the known soap-forming metals such as sodium, potassium, lithium, barium, aluminum, strontium, calcium, magnesium, etc. although preferably the metal is sodium, lithium, calcium, aluminum, or barium. The fatty acid component of the soap can be derived from any fatty acid containing 10–25 carbon atoms, can be saturated or unsaturated, and can contain hydroxy substituents. As the term fatty acid is used herein it includes only those fatty acids having 10–25 carbon atoms. Examples of suitable fatty acid metallic soaps containing metal and fatty acid components as described include sodium stearate, lithium stearate, lithium oleate, calcium ricinoleate, calcium oleate, aluminum palmitate, etc.

Although the suitable soaps described above are characterized in that all acid anions of the soap molecule are derived from fatty acids, the term fatty acid metallic soap also includes, for the present purpose, the fatty acid complex metallic soaps well known in the art. These soaps, which have also been referred to in the art as complex soaps, complex soap-salts, etc., contain a polyvalent soap forming metal as the cation of the soap molecule while the anions of the soap molecule are derived from both fatty acids and relatively low molecular weight organic acids. The relatively low molecular weight organic acid anion present will depend mainly upon the polyvalent metal present. Where the polyvalent metal is aluminum the anion is preferably the anion of an aromatic monocarboxylic acid containing 7–12 carbon atoms. Preferably the anion is that of benzoic acid. Where the polyvalent metal is an alkaline earth metal such as calcium or barium the anion is preferably derived from aliphatic mono- and polycarboxylic acids containing 2–7 carbon atoms. Preferably the anion is that of acetic acid. The fatty acids and polyvalent metals suitable for use in forming fatty acid complex metallic soaps are as previously described. Preferably the polyvalent metal is calcium, aluminum, or barium. Examples of fatty acid complex metallic soaps having metal and acid components as described above are aluminum benzoate stearate, aluminum palmitate toluate, calcium stearate acetate, barium oleate propionate, barium linolenate acetate, etc.

The complex soaps can be prepared by methods well known in the art. Thus aluminum benzoate stearate is precipitated from an aqueous solution of sodium stearate and sodium benzoate by the addition thereto of aluminum sulfate. The ratio of benzoate anions to stearate anions in the resulting soaps is determined by the ratio of sodium benzoate to sodium stearate in the aqueous solution. For grease purposes the ratio of benzoate anions to stearate anions in the soap is usually in the range of 0.2:1 to 5:1. It is also well known to prepare the complex soap in situ in the oil component of the grease composition. Thus a mixture of acetic acid and stearic acid is admixed with oil after which hydrated lime is added to the admixture and allowed to react with the mixed acids to form the complex soap.

Of the fatty acid metallic soaps suitable for the present purpose the fatty acid complex metallic soaps are preferred because they generally result in greases having substantially higher dropping points than can be obtained in greases prepared from the non-complex soaps such as sodium stearate, calcium stearate, aluminum stearate, etc.

The polymeric components of the greases of the invention can be prepared by methods well known in the olefin polymerization art. Atactic polypropylene can be prepared by subjecting propylene, in an inert solvent such as pentane, hexane, etc. to the action of a metal halidemetal alkyl complex catalyst, the preferred catalyst being titanium trichloride-aluminum triethyl complex. The reaction temperature is maintained at about 140° F. to 180° F. and the pressure at about 100–250 p.s.i.g. The amount of TiCl$_3$ used is usually 0.05–5.0% by weight of solvent and the molar ratio of aluminum to titanium is preferably 0.5:1 to 1.0:1. The amount of solvent employed is usually such that the amount of solvent soluble polypropylene produced is 10–30% by weight of solvent. After a reaction time of 30 minutes to 2 hours the reaction is killed by adding a small amount of methanol. The polymer product consists of both isotactic and atactic polypropylene. The isotactic polymer is insoluble in the solvent and is separated by filtration, etc. The atactic polymer is soluble in the solvent and is recovered therefrom by stripping off the solvent. To insure a high purity atactic polymer it is usually desirable to redissolve it in an additional quantity of solvent, separate any insoluble matter, and again strip off the solvent. The molecular weight of the recovered atactic polypropylene will be in the range of 10,000 to 50,000 as determined by intrinsic viscosity in Tetralin at 135° C. and can be varied by varying reaction time. All molecular weights used herein are according to this method. The intrinsic viscosity in Tetralin at 135° C. for atactic polypropylene having a molecular weight in the range of 10,000 to 50,000 will usually be in the range of 0.3 to 1.5.

The solubility of atactic polypropylene in mineral lubricating oil varies depending mainly upon the molecular weight of the polymer and the type of mineral oil used. As the molecular weight increases the solubility decreases. Atactic polypropylene is generally less soluble in paraffinic oils than in naphthenic or aromatic oils. Within the specified molecular weight range, i.e., 10,000–50,000, atactic polypropylene is sufficiently soluble in mineral oils to achieve the beneficial results of the invention.

Atactic ethylene-propylene copolymers can also be prepared by known methods. One such method involves the same procedure as described above for the preparation of atactic polypropylene except that the charge to the reaction vessel consists of both propylene and ethylene. If the ethylene and propylene are charged simultaneously the ethylene portion of the charge is usually about 0.1% by weight of the propylene. The polymer product will be a random polymer containing about 1–3% ethylene and will contain both isotactic and atactic fractions. The latter fraction is solvent soluble and is separated as described above. The intrinsic viscosity in Tetralin at 135° C. of the polymer, which is a measure of the molecular weight of the polymer can be varied between about 0.1 to 6.0 by changes in the reaction time. The ethylene-propylene copolymers suitable for the present purpose are characterized in terms of intrinsic viscosity rather than molecular weight because for these polymers the correlation between intrinsic viscosity and molecular weight is not known with certainty in the prior art. If the ethylene and propylene are alternately charged to the reaction vessel, atactic block copolymer and isotactic block copolymer are obtained, which copolymers will usually have an ethylene content of less than 5%. Solely atactic ethylene-propylene copolymers can be prepared by the use of a catalyst system comprising an aluminum compound such as diethylaluminum chloride and a vanadium compound such as the diethyl ester of chloro-orthovanadic acid. Such catalysts and the techniques of polymerization are described in detail in Republic of South Africa Patent No. 69,839 issued to Hercules Powder Co. The vanadium-aluminum catalyst system is especially useful in preparing copolymers of high (e.g., 40–75%) ethylene content.

The solubility of atactic ethylene-propylene copolymers in mineral oils also varies as described above for atactic polypropylene. Copolymers having an intrinsic viscosity in Tetralin at 135° C. in the range of 0.3 to 4.0 are sufficiently oil soluble to achieve the beneficial results of the invention. The amount of polymer incorporated in the grease should be 2–10% in the case of atactic polypropylene and 0.3–5.0% in the case of atactic ethylene-propylene copolymer. Within these ranges higher amounts of polymer generally results in greater improvement in the water resistance of the grease; consequently the amount of polymer used can be adjusted to give the water resistance desired in the particular application contemplated. Preferably the amount of atactic polypropylene is 3–7% and the amount of atactic ethylene-propylene copolymer is 0.5–2.0%.

The polymeric component of the grease can be incorporated into the grease either during the preparation of the grease or subsequent thereto. For example, most greases are prepared by adding the thickener to the lubricating oil at a temperature of about 200° F., stirring until uniform, heating to about 350–500° F., and cooling to room temperature. Grease consistency is generally reached at some point in the cooling cycle. Where additives such as oxidation inhibitors are to be included in the grease composition they are usually milled into the grease at about 200° F. in the cooling cycle. The specific techniques employed vary depending mainly upon the actual thickeners used and are well known in the art. The atactic polypropylene or the atactic ethylene-propylene copolymer can be added to the oil at about the same time the soap or other thickener is added to the oil, or, alternatively, can be milled into the grease at some point, preferably about 200° F., in the cooling cycle. In either case the polymer dissolves in the oil to produce a grease having improved adhesive-cohesive properties. In order to improve the rate of dissolution of the polymer in the oil, it has generally been found preferable to add the polymer to the oil at or about the time the thickener is added, i.e., prior to heating to the elevated temperature.

The following examples illustrate the invention more specifically. The water spray resistance test used to evaluates the greases in the examples is the test (PETM #1015) presently used by General Motors Corp., Ternstedt Division, in order to determine the suitability of the grease as an auto body hardware grease. Auto body hardware greases are used on automobile door latches, door hinges, window mechanisms, etc. In such an application it is desirable that the grease not wash off when contacted by water. The test utilizes a chrome plated steel panel 2″ by 6″ by 1/16″. Two parallel lines on the panel divide it into three adjacent rectangular areas, the center area being 2″ by 4″, the two outer areas being 1″ by 2″. The entire panel is covered by a layer of the grease to be tested, 1/32″ thick. The panel is weighed and is then mounted 12″ away from a nozzle attached to a water line. The nozzle used is identified as Full Jet #1/2 GG–25 and is manufactured by Spraying Systems, Inc., Chicago, Ill. Water at 100° F. and at a nozzle pressure of 20 p.s.i.g. is sprayed onto the panel for a period of 5 minutes, after which the water is shut off and the panel is dried at 150° F. for 1 hour. Next any grease on the two 1″ by 2″ outer areas is scraped off and the panel is again weighed. Knowing the initial and final weights of the panel and the dimensions of the 3 rectangular areas on the panel it is possible to calculate the percentage of grease originally within the 2″ by 4″ area which was washed off by the water spray. This percentage is the amount of water washoff.

*Example I*

44 parts of mineral lubricating oil is heated in a grease kettle to 240° F. and is held at this temperature while adding 1 part lithium hydroxide and 11.7 parts stearic acid to the oil. The oil has the following properties: viscosity at 100° F.—50.7 S.U.S., viscosity at 210° F.—63 S.U.S., viscosity index—93, pour point—0° F., flash point—490° F., fire point—555° F., A.P.I. gravity—29.3. After adding the lithium hydroxide and stearic acid the mixture is stirred at 240° F. for about 20 minutes. Next 44 more parts of oil are added and the mixture is stirred until uniform. The mixture is then heated to a temperature of 375° F., held there for 5–10 minutes and is then cooled to 200° F. By 200° F. grease consistency has been reached. The grease is milled at 200° F. in a Gaulin Homogenizer at a pressure of 1000 p.s.i.g. and is then allowed to cool to room temperature. The soap content of the grease is 12%. The grease has a water washoff of 62.5%.

Example II

The procedure is the same as in Example I except that at 200° F. in the cooling cycle and just prior to milling 5.3 parts of atactic polypropylene are added to the grease. The atactic polypropylene has the following properties:

Molecular weight _____ 20,000
Intrinsic viscosity in Tetralin at 135° C. _____ 0.5
Specific gravity _____ 0.86

The atactic polypropylene content of the final grease is 5%. The grease has a water washoff of 9%. By comparing Examples I and II it is apparent that the addition of atactic polypropylene effects a distinct improvement in water washoff.

Example III

An aluminum complex soap grease is prepared by adding 10 parts aluminum benzoate stearate to 55 parts of oil at 190° F., stirring the mixture for about 20 minutes until the soap is dissolved in the oil, adding an additional 60 parts oil, stirring another 10–15 minutes, heating the mixture to 410° F., cooling the mixture to 200° F., by which temperature grease consistency is reached, and milling the resulting grease at 200 °F. in a Gaulin Homogenizer at 1000 p.s.i.g. The oil used is the same type as in Example I. The aluminum benzoate stearate soap is obtained by addition of aluminum sulfate to an aqueous solution of sodium benzoate and sodium stearate in which the molar ratio of these salts is 1:1. The grease has a water washoff of 98%.

Example IV

The procedure is the same as in Example III except that at 200° F. in the cooling cycle and just prior to milling 6.6 parts of atactic polypropylene having the same properties as listed in Example II is added to the grease. The atactic polypropylene content of the final grease thus is 5%. The grease has a water washoff of 19.7%. By comparing Examples III and IV it can be seen that the addition of atactic polypropylene to a fatty acid complex metallic soap grease effects a distinct improvement in water washoff.

Example V

The procedure is the same as in Example III except that 6.6 parts of atactic polypropylene having the same properties as listed in Example III is added to the oil simultaneously with the soap and no more atactic polypropylene is added thereafter. The final grease has a water washoff of 19%, essentially the same as in Example IV when the atactic polypropylene was incorporated into the grease during the milling step.

Example VI

The procedure is the same as in Example IV except that instead of adding 6.6 parts atactic polypropylene 6.6 parts of polyethylene having a molecular weight of 20,000 is added. The final grease has a water washoff of 90%. This shows that polyethylene is substantially ineffective as a means of reducing water washoff.

Example VII

The procedure is the same as in Example IV except that instead of adding 6.6 parts atactic polypropylene 6.6 parts of polyisobutylene having a molecular weight of 10,000 is added. This molecular weight polyisobutylene is as close to 20,000 molecular weight as can be commercially obtained. The grease has a water washoff of 34.1%.

Example VIII

The procedure is the same as in Example V except that 3.9 parts of atactic polypropylene is added. The polymer content of the final grease thus is 3%. The final grease has a water washoff of 40%.

Example IX

The procedure is the same as in Example V except that 1.26 parts of an atactic ethylene-propylene terminal block copolymer having a terminal block of ethylene is added to the oil. The copolymer has an inherent viscosity in Tetralin at 135° C. of 1.8 and an ethylene content of 4%. The polymer content of the grease is 1%. The grease has a water washoff of 9.6%.

Example X

The procedure is the same as in Example IX except that 1.26 parts of an atactic multiple block ethylene-propylene copolymer is added. The copolymer contains multiple blocks of both ethylene and propylene, has an ethylene content of 1% and an inherent viscosity of 2.3. The grease has a polymer content of 1% and a water washoff of 7.7%.

Example XI

The procedure is the same as in Example IX except that 0.63 part of polymer is added. Thus the polymer content of the grease is 0.5%. The grease has a water washoff of 29.7%.

Example XII

The procedure is the same as in Example X except that 0.63 part of polymer is added. Thus the polymer content of the grease is 0.5%. The grease has a water washoff of 24.5%.

Example XIII

The procedure is the same as in Example V except that 1.26 parts of an atactic ethylene-propylene random copolymer having an ethylene content of 50%, an intrinsic viscosity of 0.8 is added. The polymer content of the grease is 1% and the grease has a water washoff of 11%.

Example XIV

The procedure is the same as in Example V except that 1.26 parts of an atactic ethylene-propylene random copolymer having an ethylene content of 58% and an intrinsic viscosity of 2.8 is added. The polymer content of the grease is 1% and the grease has a water washoff of 9.3.%

It is evident from the above examples that atactic polypropylene and atactic ethylene-propylene copolymers not only effect a substantial improvement in the adhesive-cohesive properties of greases but also that these polymers are distinctly superior to other polyolefins. This is brought out more clearly by the data contained in Table I below which summarizes some of the above examples.

TABLE I

| Polymer | Amount, percent | Water Washoff |
|---|---|---|
| None | | 98% (Example III). |
| Polyethylene | 5 | 90% (Example VI). |
| Polyisobutylene | 5 | 34.1% (Example VII). |
| Atactic Polypropylene | 5 | 19.7% (Average of Examples IV and V). |
| Atactic Ethylene-Propylene Copolymer. | 1 | 9.4% (Average of Examples IX, X, XIII, and XIV). |

From the data presented in Table I it can be determined that the water washoff obtained with polyethylene and polyisobutylene is about 4.6 and 1.7 times higher respectively than that obtained with atactic polypropylene and is about 9.6 and 3.6 times higher than that obtained with atactic ethylene-propylene copolymers. Furthermore, it should be noted that these factors of 9.6 and 3.6 do not reflect the entire benefit obtained from atactic ethylene-propylene copolymers for as can be seen from the data in Table I, 1% of the copolymer gives results distinctly superior to those obtained with 5% of either polyethylene or polyisobutylene. That the atactic polymers used in the invention should be markedly superior is completely unexpected.

The invention claimed is:

1. A grease composition comprising as a first component a major proportion of mineral lubricating oil thickened to grease consistency with a minor proportion of a thickening agent and as a second component, in an amount sufficient to improve the water washoff of the composition, a material selected from the group consisting of 2–10% oil-soluble atactic polypropylene as the only propylene homopolymer in said composition and 0.3–5% oil-soluble atactic ethylene-propylene copolymer, all percentages and proportions being by weight of the total composition.

2. A grease composition according to claim 1 wherein said oil-soluble atactic polypropylene has a molecular weight of 10,000 to 50,000 and said oil-soluble atactic ethylene-propylene copolymer has an intrinsic viscosity in the range of 0.3 to 4.0.

3. A grease composition according to claim 2 wherein said thickening agent is a fatty acid metallic soap.

4. A grease composition according to claim 1 wherein said material is atactic polypropylene.

5. A grease composition according to claim 1 wherein said material is atactic ethylene-propylene copolymer.

6. A grease composition according to claim 2 wherein said molecular weight is in the range of 15,000 to 35,000 and said intrinsic viscosity is in the range of 0.5 to 2.5.

7. A grease composition according to claim 2 wherein the first mentioned amount of said material is 3–7% and the last mentioned amount of said material is 0.5–2.0%.

8. A grease composition according to claim 3 wherein said molecular weight is in the range of 15,000 to 35,000 and said intrinsic viscosity is in the range of 0.5 to 2.5.

9. A grease composition according to claim 3 wherein the amount of (a) is 3–7% and the amount of (b) is 0.5–2.0%.

10. A grease composition according to claim 3 wherein said fatty acid metallic soap is a complex soap.

11. A grease composition according to claim 9 wherein said complex soap is selected from the group consisting of complex aluminum soaps and complex calcium soaps, said complex aluminum soaps having one anion derived from a fatty acid and having another anion derived from an aromatic carboxylic acid containing 7–12 carbon atoms, and said complex calcium soaps having one anion derived from a fatty acid and having another anion derived from an aliphatic carboxylic acid containing 2–6 carbon atoms.

12. A grease composition according to claim 11 wherein said molecular weight is in the range of 15,000 to 35,000 and said intrinsic viscosity is in the range of 0.5 to 2.5.

13. A grease composition according to claim 11 wherein the amount of (a) is 3–7% and the amount of (b) is 0.5–2.0%.

References Cited by the Examiner

UNITED STATES PATENTS

| | | | |
|---|---|---|---|
| 2,810,695 | 10/1957 | Young et al. | 252—39 X |
| 2,917,458 | 12/1959 | Morway et al. | 252—32 |
| 3,083,160 | 3/1963 | Agius et al. | 252—59 X |
| 3,098,042 | 7/1963 | Morway et al. | 252—59 X |
| 3,211,650 | 10/1965 | Oswalt | 252—59 X |

DANIEL E. WYMAN, *Primary Examiner.*

I. VAUGHN, *Assistant Examiner.*